United States Patent
Tiwary et al.

(10) Patent No.: US 11,514,275 B2
(45) Date of Patent: Nov. 29, 2022

(54) DATABASE INSTANCE TUNING IN A CLOUD PLATFORM

(71) Applicant: SAP SE, Walldorf (DE)

(72) Inventors: Mayank Tiwary, Odisha Rourkela (IN); Saurav Mondal, West Bengal (IN); Pritish Mishra, Odisha (IN); Kirti Sinha, Delhi (IN)

(73) Assignee: SAP SE, Walldorf (DE)

( * ) Notice: Subject to any disclaimer, the term of this patent is extended or adjusted under 35 U.S.C. 154(b) by 519 days.

(21) Appl. No.: 16/659,380

(22) Filed: Oct. 21, 2019

(65) Prior Publication Data
US 2021/0117719 A1   Apr. 22, 2021

(51) Int. Cl.
*G06K 9/00* (2022.01)
*G06K 9/62* (2022.01)
*G06N 3/02* (2006.01)
*G06F 16/21* (2019.01)
*G06N 5/04* (2006.01)

(52) U.S. Cl.
CPC ........... *G06K 9/628* (2013.01); *G06F 16/217* (2019.01); *G06K 9/6262* (2013.01); *G06N 3/02* (2013.01); *G06N 5/04* (2013.01)

(58) Field of Classification Search
CPC .... G06K 9/628; G06K 9/6262; G06F 16/217; G06N 3/02; G06N 5/04; G06N 3/0481; G06N 3/08; G06N 7/005; G06N 20/10
See application file for complete search history.

(56) References Cited

U.S. PATENT DOCUMENTS

| | | | |
|---|---|---|---|
| 2018/0157838 A1* | 6/2018 | Bushey | G06N 20/00 |
| 2020/0293503 A1* | 9/2020 | P | G06N 5/04 |
| 2020/0410379 A1* | 12/2020 | Das | G06N 3/08 |

OTHER PUBLICATIONS

"Cloud Foundry—Open Source Cloud Application Platform", Cloud Foundry, Inc., [Online]. Retrieved from the Internet: <URL: https://www.cloudfoundry.org/>, (2019), 5 pgs.
"Cloud Foundry BOSH", [Online]. Retrieved from the Internet: <URL: https://bosh.io/docs/>, (2019), 2 pgs.
Agrawal, et al., "Integrating Vertical and Horizontal Partitioning into Automated Physical Database Design", In Proceedings of the ACM SIGMOD international conference on Management of data, (2004), 12 pgs.
Brown, Kurt, et al., "Goal-Oriented Bu?er Management Revisited", SIGMOD, (1996), 353-364.

(Continued)

*Primary Examiner* — Ping Y Hsieh
(74) *Attorney, Agent, or Firm* — Schwegman Lundberg & Woessner, P.A.

(57) ABSTRACT

Various examples are directed to systems and methods for tuning a database service in a cloud platform. A tuning service may access a neural network model trained to classify workload points to one of classes. The tuning service may execute the neural network model with a first source workload point as input to return a first class as output, where the first source workload describing a source database. The tuning service may select a target workload for the first source workload point from a plurality of reference workloads. Selecting the target workload may be based at least in part on the first class returned by the neural network model. The tuning service may generate a recommended knob configuration for the source database using the target workload.

20 Claims, 12 Drawing Sheets

(56) References Cited

OTHER PUBLICATIONS

Chandhuri, S., et al., "An Efficient, Cost-Driven Index Selection Tool for Microsoft SQL Server", Proceedings of the 23rd International Conference on Very Large Data Bases, (1997), 146-155.
Chaudhuri, S, et al., "Self-tuning database systems: a decade of progress", VLDB, (2007), 3-14.
Debnath, B, et al., "A Statistical Approach for Ranking Database Tuning Parameters", IEEE 24th International Conference on Data Engineering Workshop, (2008), 11-18.
Dias, Karl, "Automatic Performance Diagnosis and Tuning in Oracle", Proceedings of the CIDR Conference, (2005), 11 pgs.
Duan, S, et al., "Tuning Database Configuration Parameters with iTuned", VLDB, 2, (2009), 1246-1257.
Gupta, H, et al., "Index Selection for OLAP", ICDE, (1997), 208-219.
Kumar, S, "Oracle Database 10g: The self-managing database", White Paper, (Nov. 2003), 28 pgs.
Ma, Lin, et al., "Query-based Workload Forecasting for Self-Driving Database Management Systems", SIGMOD, (2018), 15 pgs.
Narayanan, D, et al., "Continuous resource monitoring for self-predicting DBMS", MASCOTS, (2005), 239-248.
Pavlo, A, et al., "External vs. Internal: An Essay on Machine Learning Agents for Autonomous Database Management Systems", IEEE Data Engineering Bulletin, (2019), 32-46.
Pavlo, A, et al., "On predictive modeling for optimizing transaction execution in parallel OLTP systems", Proceeding of the VLDB Endownment, vol. 5, No. 2, (2011), 85-96.
Pavlo, A, et al., "Self-driving database management systems", CIDR, (2017), 6 pgs.

Rao, et al., "Automating Physical Database Design in a Parallel Database", In Proceedings of the ACM SIGMOD international conference on Management of data, (2002), 558-569.
Shannon, C. E., "A Mathematical Theory of Communication", The Bell System Technical Journal, 27, (1948), 379-423, 623-656.
Sullivan, D., "Using Probabilistic Reasoning to Automate Software Tuning", SIGMETRICS, (2004), 404-405.
Swan, E, et al., "Automatic Configuration for IBM® DB2 Universal Database™", IBM Performance Technical report, (2002), 13 pgs.
Valentin, G, et al., "A. DB2 Advisor: An Optimizer Smart Enough to Recommend its Own Indexes", 16th International Conference on Data Engineering, 2000. Proceedings., (2000), 101-110.
Van Aken, D, et al., "Automatic Database Management System Tuning Through Large-scale Machine Learning", Proceedings of the ACM International Conference on Management of Data, (2017), 1009-1024.
Van Aken, D, et al., "BenchPress: Dynamic Workload Control in the OLTP-Bench Testbed", in Proceedings of the ACM SIGMOD International Conference on Management of Data, (2015), 1069-1073.
Weikum, G, et al., "The Comfort Automatic Tuning Project", Information Systems, 19(5), (Jul. 1994), 381-432.
Wiggins, Adam, "The Twelve-Factor App: Backing-Services", [Online]. Retrieved from the Internet: <URL: https://12factor.net/backing-services>, (2019), 2 pgs.
Yagoub, K, et al., "Oracle's SQL Performance Analyzer", IEEE Data Engineering Bulletin, 31(1), (2008), 8 pgs.
Zhang, Bohan, et al., "A Demonstration of the OtterTune Automatic Database Management System Tuning Service", PVLDB, vol. 11, iss. 12, (2018), 1910-1913.
Zilio, Daniel, "Physical Database Design Algorithms and Concurrent Reorganization for Parallel Database Systems", PhD Thesis, Graduate Department of Computer Science University of Toronto, (1998), 295 pgs.

\* cited by examiner

DATABASE INSTANCE TUNING IN A CLOUD PLATFORM

TECHNICAL FIELD

This document generally relates to methods and systems for use with computing systems. More particularly, this document relates to ways of tuning databases in a cloud platform computing system.

BACKGROUND

Modern databases have many input parameters that can be adjusted to modify the behavior of the database. These database input parameters may be referred to as knobs. Example knobs for a database include the amount of memory used for caches, the amount of memory used for transaction log buffers, how often data is written to storage, etc. Database knobs can be tuned to maximize the performance of the database for a given workload. Such tuning, however, can be challenging. For example, a single database may have hundreds of knobs, providing a very large number of possible knob configurations. Also, many knobs are dependent on one another, meaning that changes to one knob can change the effect that other knobs have on the database. Further, different database management systems have different knobs and even different numbers of knobs, making it difficult to use any standardized tuning technique across different database types.

BRIEF DESCRIPTION OF DRAWINGS

The present disclosure is illustrated by way of example and not limitation in the following figures.

DETAILED DESCRIPTION

Figure 1:
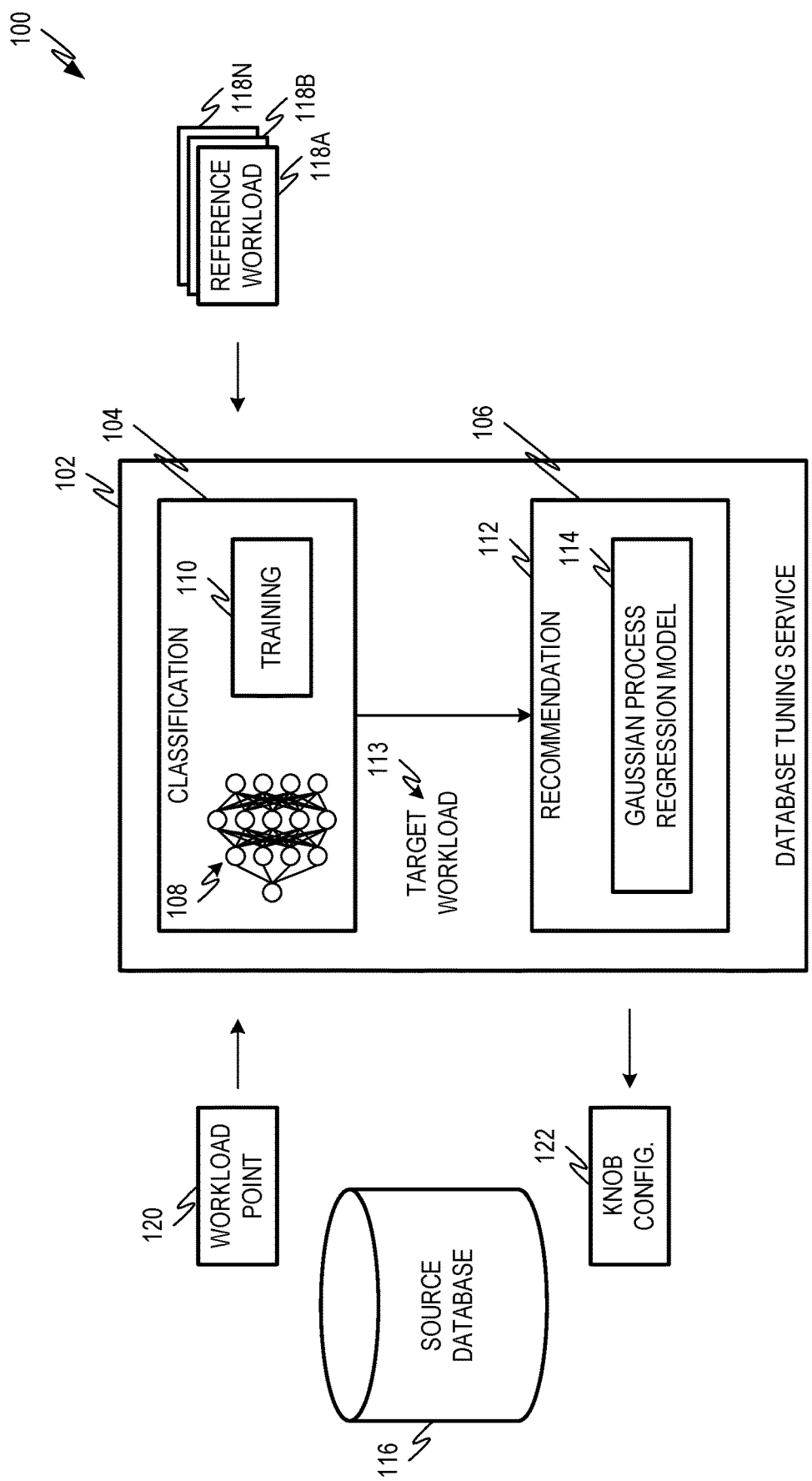
FIG. 1 shows one example of an environment for implementing database tuning.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Existing solutions for automatically tuning databases in a cloud platform suffer from various disadvantages. For example, many automated tuning techniques are designed specifically for a particular type of database management system and cannot be applied to databases in general. Because many cloud platforms utilize multiple different types of databases having different database management systems, a cloud platform would be required to install and maintain multiple different types of database-specific tuning services. Further databases that are not supported by a database-specific tuner would not be served.

Generic database tuners that tune many different types of databases could address this issue, however, existing generic database tuners suffer from their one deficiencies. One generic database tuning technique is known as Ottertune. An Ottertune Style Tuner (OST) utilizes historical data about the knob settings, workloads, and performance of a source database to generate knob settings for the source database that are tailored to a source workload. An OST tuner executes a classification operation and a recommendation operation. In the classification operation, the OST tuner identifies a target workload from among a set of reference workloads. The reference workloads are workloads that have been applied to and/or modeled at the source database. The target workload is the reference workload that is most similar to the source workload. To identify the target workload, the OST tuner accesses and/or generates data describing reference performance metrics for the source database under various combinations of reference workloads and reference knob settings. The reference performance metrics can be observed experimentally and/or modeled using one or more Gaussian Process Regression (GPR) models. To find the target workload, the OST tuner determines a Euclidean distance between source performance metrics observed under the source workload and reference performance metrics associated each unique combination of reference workloads and reference knob settings. The reference workload associated with the shortest Euclidian distance is considered to be the target workload.

In the recommendation operation, the OST tuner utilizes the reference data describing the target workload to determine a recommended knob configuration for the source workload. Reference data describing the target workload is used to train a GPR model that relates knob configurations to performance metrics for the source database under the source workload. The model is then utilized to generate a recommended knob configuration, for example, to optimize a given performance metric, such as, read speed, write speed, accuracy, etc.

Although OST tuners can provide acceptable results in some circumstances, they still suffer from significant disadvantages, especially in a cloud platform environment. For example, utilizing GSTs to generate predicted performance metrics for different reference workloads and reference knob settings can be time and resource intensive. Generating the necessary Euclidean distances for each permutation of the source performance metrics and reference performance metrics associated the unique combinations of reference workloads and reference knob settings can also be time and resource intensive. As a result, OST tuner classification can be difficult to complete in a timely enough manner to meet the service level agreements (SLAs) common in cloud platforms.

OST tuners also suffer from what can be referred to as the cold-start problem. The cold-start problem arises because, for OST tuners, the accuracy of the classification operation depends on the size of the source workload. If the size of the source workload is small, for example, because the source database instance has only been observed by the tuner for a short time, then the accuracy of the classification operation suffers. When the accuracy of the classification operation suffers, the accuracy of the recommendation operation that depends on the classification is also reduced. In extreme cases, this can lead to a recommended knob configuration that actually degrades the performance of the source database. Also, the cold-start problem can be particularly acute in a cloud platform environment, where a database service may expect to receive accurate tuning even soon afte is registered to a tuning service.

OST tuners also suffer from what can be referred to as the issue of deep mapping. In order to accurately perform the classification operation, it is necessary for there to be large numbers of observational data points for each reference workload. For example, each reference workload will need to have been observed or modeled over a large range of knob settings and performance metrics. Generating enough observational data points for the OST tuner to run correctly can be hugely resource intensive and can render the OST tuner non-deterministic, since adequate levels of observational data points cannot always be guaranteed. These problems are only exacerbated in a cloud platform environment where there is a one-to-many relationship between a tuning service and the database services that it serves.

Self-mapping is another issue that can arise in OST tuners, in examples in which the source workload is considered to be one of the reference workloads. In these cases, the OST tuner may erroneously identify the source workload as the target workload, which will compromise the performance of the tuner.

Additionally, OST tuners suffer from the problem of cascading errors. When the accuracy of the classification operation is reduced, for example, because of the issues described herein, the resulting a recommended knob configuration are less than optimal. Despite this, the recommended knob configuration are typically applied to the source database and thereby affect the source workload, resulting in reduced accuracy for any subsequent tuning requests.

Some or all of these and/or other problems are addressed by the database tuning methods and systems described herein. Various examples described herein implement a database tuning service that performs a classification operation using a neural network model. The neural network model is trained on data describing the reference workloads. For example, the neural network model may be trained with a total of n reference workloads, which create a total of n classes, with each class corresponding to one reference workload. A new source workload point is provided to the trained neural network model as input. In response, the neural network model classifies the source workload into one of the n classes. The reference workload corresponding to the returned class is the target workload that is used in the recommendation step as described herein.

FIG. 1 shows one example of an environment 100 for implementing database tuning. The environment 100 includes a database tuning service 102 that generates recommended knob configurations to tune one or more source databases 116. The source database 116 is under a source workload. The database tuning service 102 comprises a classification module 104 that implements a classification operation and a recommendation module 112 that implements a recommendation operation. Although one source database 116 is shown, the database tuning service 102 is configured, in some examples, to providing tuning for multiple different source databases.

Figure 4:
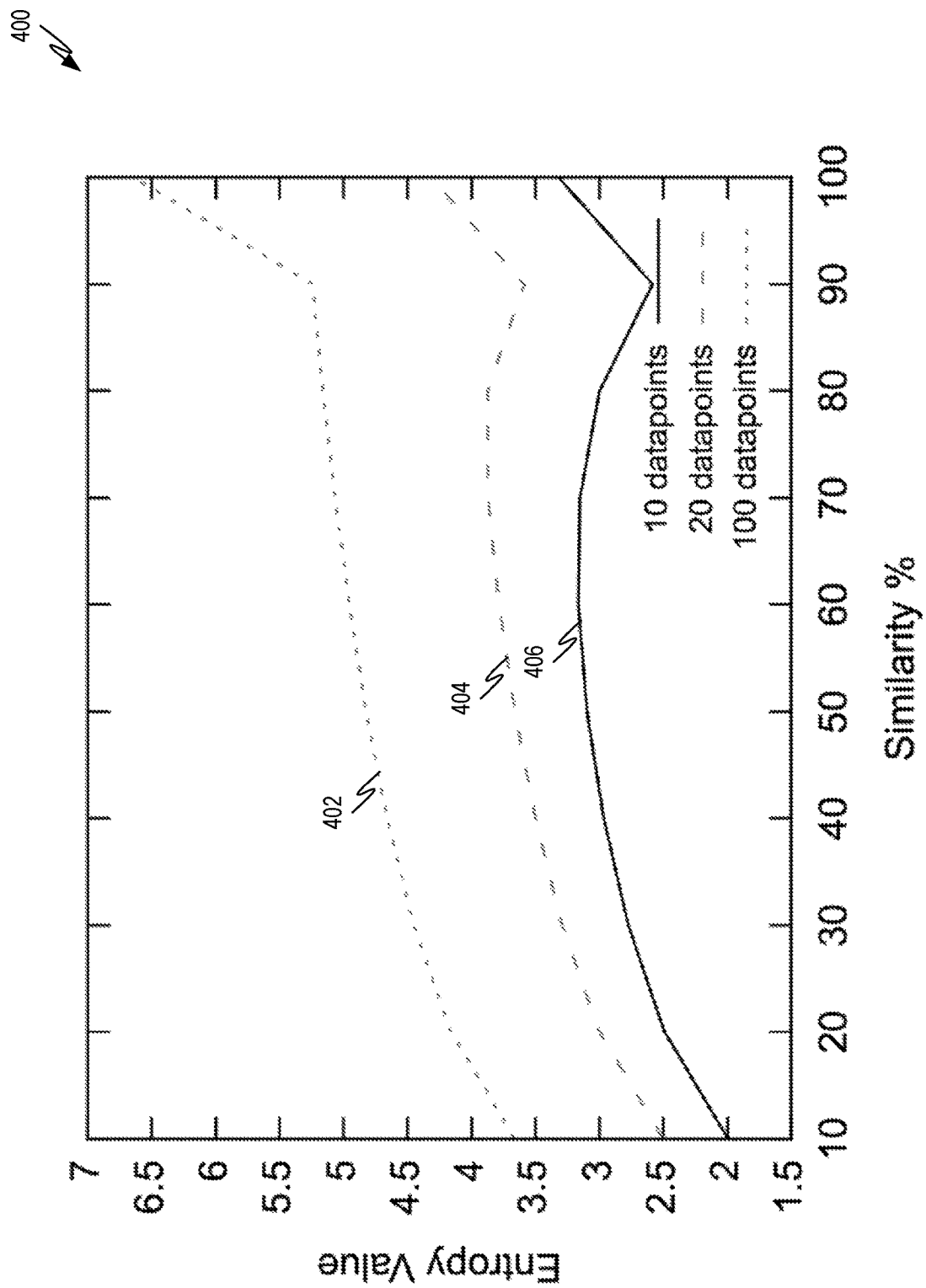
FIG. 4 is a diagram showing a similarity index versus entropy for an example neural network model.
Figure 5:
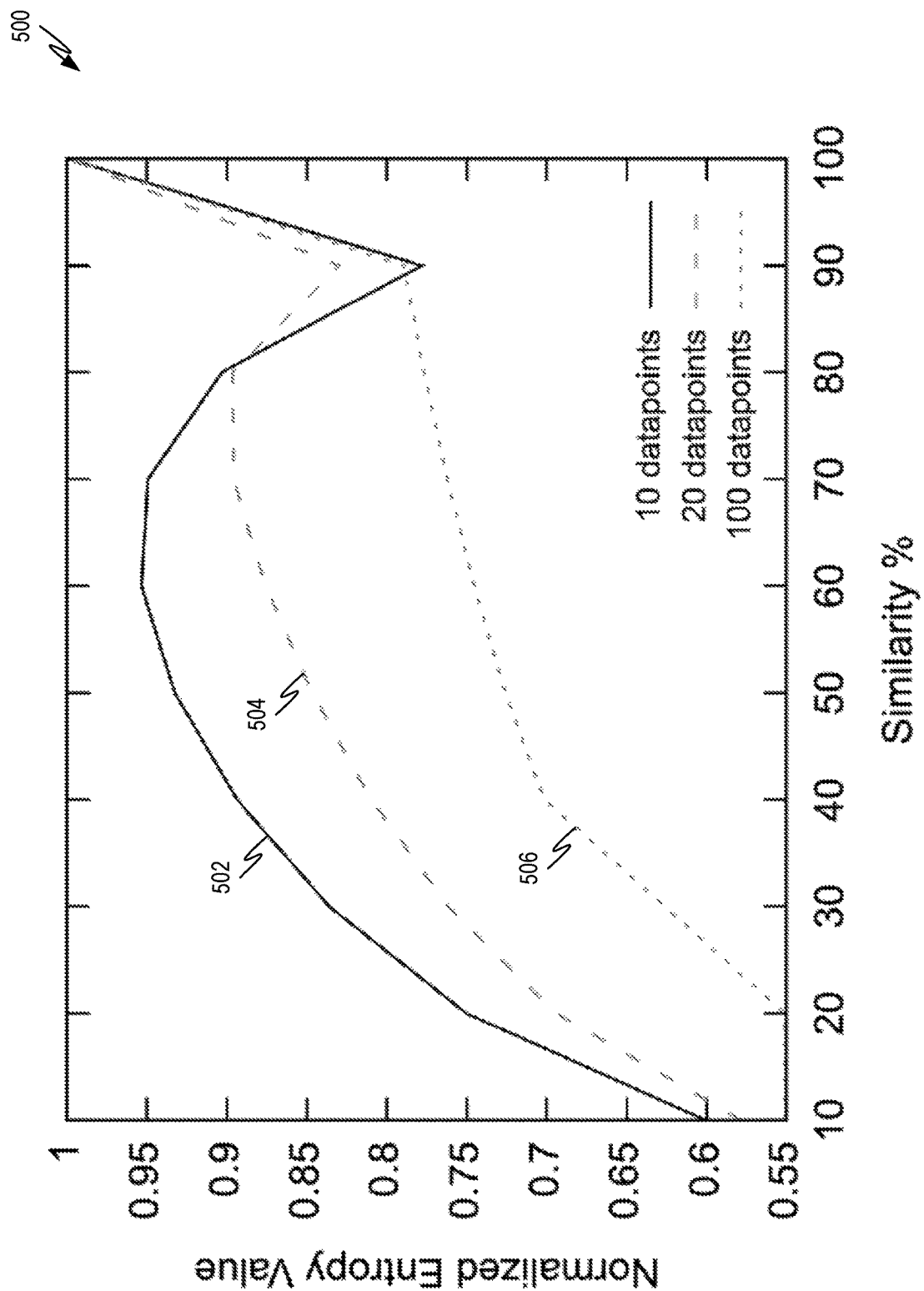
FIG. 5 is a diagram showing a similarity index versus normalized entropy for an example neural network model.

The database tuning service 102 can execute, for example, at a cloud platform deployment, described in more detail herein with respect to FIGS. 4 and 5. In some examples, however, the database tuning service 102 can be executed outside of a cloud platform. For example, the database tuning service 102 may be executed at a data center or other system that includes one or more source databases for tuning.

The classification module 104 implements a classification operation utilizing a neural network model 108. The classification module 104 receives a source workload point 120 from the source workload at the source database 116. Based on the source workload point 120, the classification module 104 selects a target workload 113 from among the reference workloads 118A, 118B, 118N. The classification module 104 accesses a neural network model 108 that is trained to classify workload points, such as the workload point 120, to one of the reference workloads 118A, 118B, 118N.

A workload point, such as the workload point 120, corresponds to a time t and indicates the state of the database (e.g., the source database 116 and/or a similar database) at the time t. An example workload point is given by Equation [1] below:

$$\{k_i, m_i\}_{w_n} \qquad [1]$$

In Equation [1], the array $k_i$ denotes the knob configuration of the database experiencing the workload $w_n$ (e.g., the source database 116 and/or a similar database) at a time t. The knob configuration is the values of all or a portion of the knobs of the relevant database. The array $m_i$ denotes the performance metrics of the database experiencing the workload $w_n$ at the time t.

The neural network model 108 may be any suitable neural network configured for classification. The neural network model 108 may have any suitable number of layers including, for example, five layers. In some examples, the neural network model 108 is fully connected. To implement classification, in some examples, the neural network model 108 includes a last layer that is a softmax layer. The softmax layer is configured such that the output of the neural network model 108 is a probability distribution indicating a probability for each class. The reference workload 118A, 118B, 118N corresponding to the class with the highest probability is selected as the target workload 113.

The classification module 104 includes a training module 110 for training the neural network model 108. The training module 110 trains the neural network model 108 utilizing the reference workloads 118A, 118B, 118N. For example, the training module 110 provides workload points from the reference workloads 118A, 118B, 118N to the neural network model 108 and trains the neural network model to correctly classify the workload points to the reference workload 118A, 118B, 118N to which the workload points belong.

The reference workloads 118A, 118B, 118N can comprise a series of workload points. In some examples, the reference workloads 118A, 118B, 118N include workloads that were observed at a production version of source database 116. A set of production reference workloads $W^P$ is given by Equation [2] below:

$$W^P = \{W_1^P, W_2^P, \ldots W_n^P, \ldots, W_N^P\} \quad [2]$$

In Equation [2], each observed workload is given by $W_n^P$, where N is the total number of observed workloads.

In some examples, the reference workloads 118A, 118B, 118N also include workloads generated offline from non-production databases. For example, the classification module 104, training module 110 or other suitable component may execute one or more benchmark workloads at a non-production database, such as a database of the same type as the source database 116. The benchmark workloads can include one or more Structured Query Language (SQL) benchmark workloads such as a Transaction Processing Performance Council (TPC) benchmark (e.g., TPC-A, TPC-B, TPC-C, etc.), the Yahoo! Cloud Serving Benchmark (YCSB), or any other suitable benchmark. In some examples, multiple mixtures of one or more of the benchmark are executed including mixtures of a benchmark workload having different read/write ratios. An expression of offline reference workloads $W^O$ is given by Equation [3] below:

$$W^O = \{W_1^O, W_2^O, \ldots, W_k^O, \ldots, W_K^O\} \quad [3]$$

In examples where production and offline reference workloads are utilized, the neural network model 108 can be trained using a union of offline and reference workloads given by Equation [4] below:

$$W^P \cup W^O \quad [4]$$

The target workload is provided to the recommendation module 112. The recommendation module utilizes the target workload 113 to generate a GPR model 114. The GPR model 114 relates knob configurations at the source database 116 to performance metrics describing the performance of the source database 116 under the source workload. The recommendation module 112 utilizes the GPR model 114 to generate a recommended knob configuration 122. In some examples, the recommended knob configuration 122 is generated to optimize a particular performance metric of the source database 116 such as, for example, accuracy, latency, etc. Generating a recommended knob configuration 122 to optimize a performance metric or metrics can include using the neural network model 108 to generate the recommended knob configuration 122 in a manner that causes the best achievable values for a performance metric or metrics. For example, a recommended knob configuration 122 that optimizes database accuracy may be generated to generate optimal values of one or more performance metrics related to accuracy.

Figure 2:
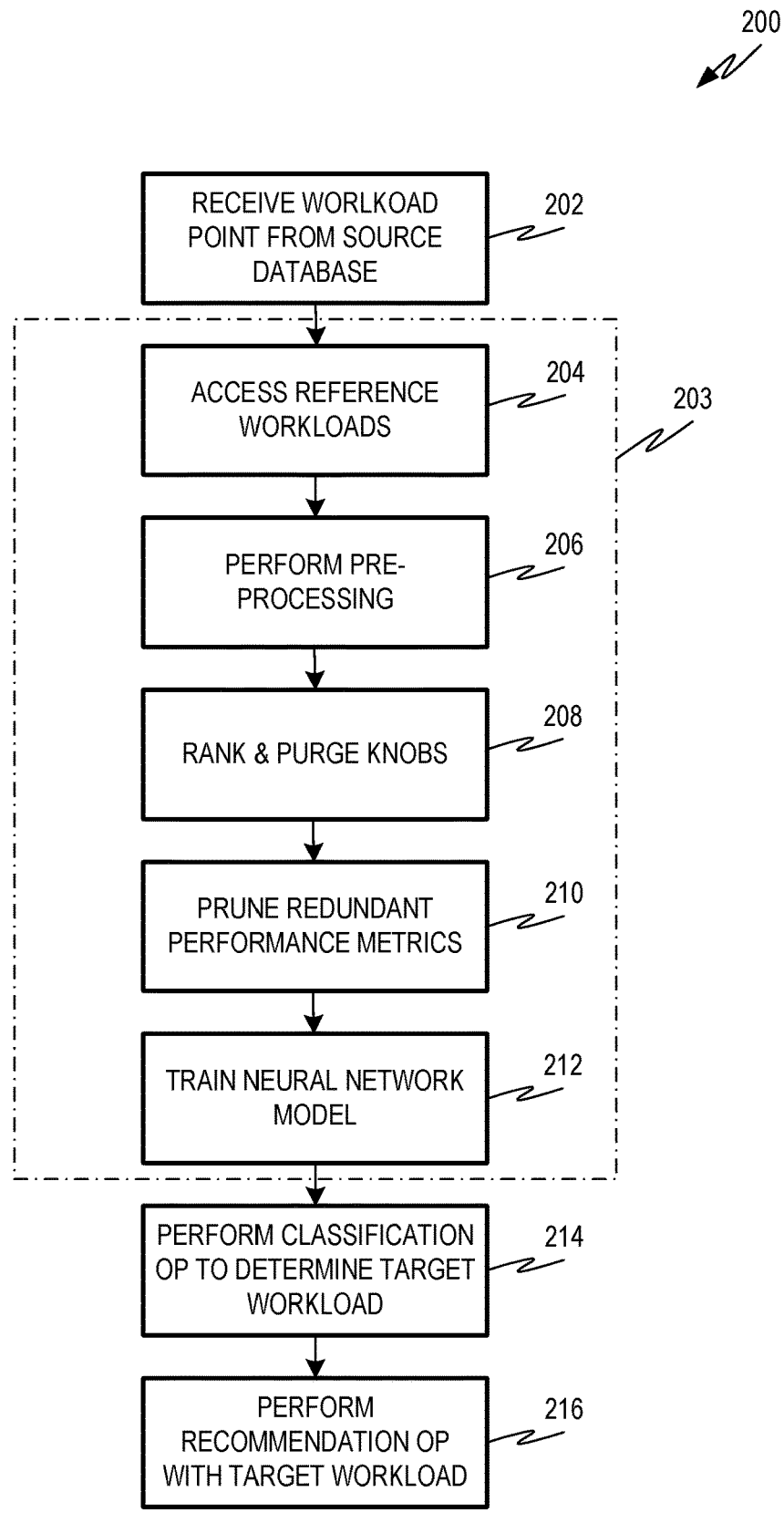
FIG. 2 is a flowchart showing one example of a process flow that may be executed by the database tuning service of FIG. 1 to generate a recommended knob configuration for a source database.

FIG. 2 is a flowchart showing one example of a process flow 200 that may be executed by the database tuning service 102 to generate the recommended knob configuration 122 for the source database 116. The process flow 200 assumes that the neural network model 108 has been previously trained and can be accessed by the classification module 104 to generate the target workload.

At operation 202, the database tuning service 102 (e.g. the classification module 104) receives the source workload point 120 describing a current source workload at the source database 116. At operation 204, the database tuning service 102 (e.g., the training module 110) accesses reference workloads 118A, 118B, 118N. As described herein, the reference workloads, in some examples, include production reference workloads $W^P$ observed at the source database 116 in a production setting as well as offline reference workloads $W^O$ generated offline at a non-production database. At operation 206, the database tuning surface performs preprocessing of the workload data such as, for example, binning, normalization, computing of deciles, etc.

At operation 208, the database tuning service 102 (e.g., the training module 110) ranks and purges knobs of the reference workloads 118A, 118B, 118N. Ranking and purging knobs can include identifying the knobs of the source database 116 that are most determinative of performance metrics. Top-ranked knobs are retained while other knobs are purged from the reference workloads 118A, 118B, 118N. In some examples, the top-ranked knobs are determined using a feature selection technique for linear regression, such as the lasso regression analysis technique, to expose knobs that have the strongest correlation to the performance of the source database 116. The top-ranked knobs may include, for example, the i knobs having an importance greater than a threshold, all knobs having an importance greater than a threshold, or any other suitable division of knobs.

At operation 210, the classification module (e.g., the training module 110) may prune redundant performance metrics from the reference workloads 118A, 118B, 118N. Redundant performance metrics may appear in the reference workloads 118A, 118B, 118N, for example, if different performance metrics report different granularities of the same metric or if multiple metrics are strongly correlated to one another. In some examples, performance metrics for pruning are identified by applying a factor analysis (FA) to the performance metrics to reduce the dimensionality of the metrics. Next a k-means technique, or similarly clustering technique, may be used to cluster the lower-dimensional data generated by the FA into groups. A limited number of performance metrics from each cluster may be retained, while other performance metrics may be pruned. In some examples, one performance metric from each cluster is retained.

At operation 212, the classification module 104 (e.g., the training module 110) trains the neural network model 108. The neural network model 108 is trained. For example, the neural network model 108 may be trained using training data that includes the reference workload data received at operation 204 and the ranked and purged knob data generated at operation 208. The training may include multiple rounds, where each round includes providing the neural network model 108 with a subset of the training data. The number of datapoints included in the subset may be determined, for example, based on the number of data points in the reference workloads to optimize the efficiency and accuracy of the trained model.

At operation 214, the classification module performs a classification operation to identify the target workload 113 from among the reference workloads 118A, 118B, 118N. This is performed by accessing the neural network model 108 that was trained at operation 212 and providing the source workload point 120 to the neural network model 108 as input. The neural network model 108 may provide, as an output, a classification indicating one of then classes of the model. The reference workload 118A, 118B, 118N corresponding to the indicated class is selected as the target workload 113.

At operation 216, the recommendation module 112 performs a recommendation operation using the target workload 113 to generate the recommended knob configuration. For example, the recommendation module 112 uses the target workload 113 to train the GPR model 114. The GPR model 114 relates knob configurations to performance metrics for the source database 116. The recommendation module 112 may generate the recommended knob configuration 122 to optimize one or more performance metrics. For example, the recommendation module 112 may generate the knob configuration 122 to optimize speed, accuracy, or any other suitable performance metric.

In the process flow 200, the operations 204, 206, 208, 210, and 212 in box 203 may be performed in real time or offline in a background routine. For example, the training module 110 may execute the operations 204, 206, 208, 210, and 212 periodically to generate the neural network model 108. The neural network model 108 may be stored at a data persistence associated with the database tuning service 102. Accordingly, upon receiving the source workload point 120, the classification module 104 may access the stored neural network model 108 and then skip to operation 214. The training module 110 may periodically re-perform some or all of the operations of the box 203 to update the purged knobs and/or pruned performance metrics and re-train the neural network model 108, if desirable.

Figure 3:
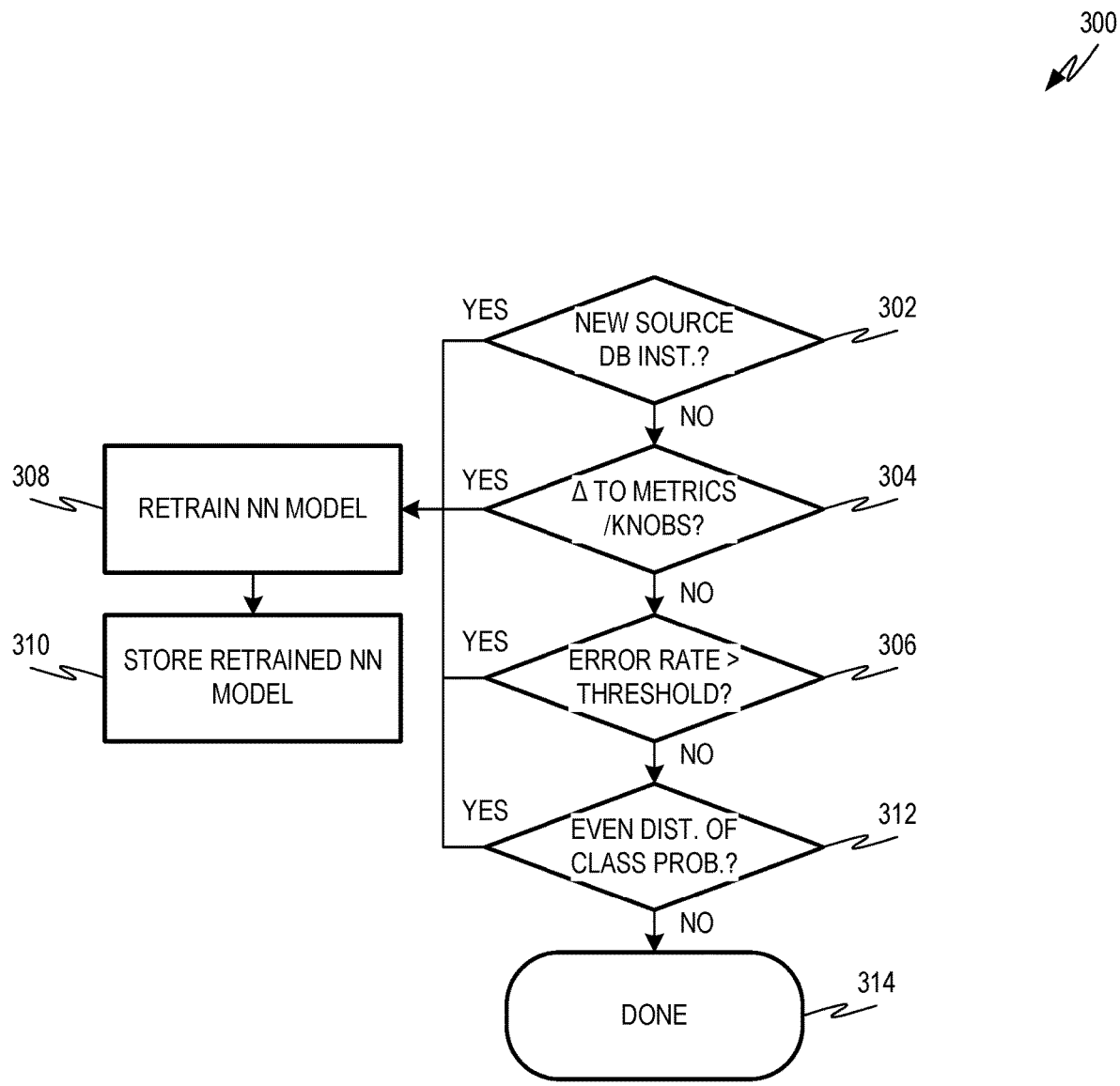
FIG. 3 is a flowchart showing one example of a process flow that may be executed to determine when to retrain the neural network model of FIG. 1.

FIG. 3 is a flowchart showing one example of a process flow 300 that may be executed, for example, by the training module 110 to determine when to retrain the neural network model 108. The process flow 300 may be performed periodically such as, for example, every hour, once a day, etc. In some examples, the process flow 300 is executed continuously. For example, the training module 110 may continuously monitor the conditions tested at decision operations 302, 304, 306, and/or 312.

At operation 302, the training module 110 determines whether a new source database instance has been added to the database tuning service 102. A new source database can be added in any suitable manner. For example, a new source database instance can be added when the new source database registers with the database tuning service 102 or when a first tuning request is received from the new source database. If a new source database instance is added at operation 302, the training module 110 retrains the neural network model 108 at operation 308. For example, the training module may retrain the neural network model 108 to consider one or more reference workloads associated with the new source database instance. In some examples, the training module 110 trains a new neural network model in addition to or instead of retraining an existing neural network model. For example, a new neural network model may be trained if the previously-trained neural network model is not suitable for the newly-added database. The retrained neural network model 108 is stored at a persistence of the database tuning service 102 at operation 310, where it can be retrieved by the classification module 104 for later use.

If there is no new source database instance, the training module 110 determines at operation 304 whether there has been any changes to the highest-ranked performance metrics and/or knobs. For example, the training module 110 may re-execute operations 208 and 210 of the process flow 200. If there are any changes to the knobs that are purged and/or performance metrics that are pruned, the training module 110 may re-train the neural network model 108 with the changed knobs and/or performance metrics purged and/or pruned from the reference workloads at operation 308 and store the retrained neural network model 108 at operation 310.

At operation 306, the training module 110 determines if the error rate threshold of the neural network model 108 exceeds a threshold error rate level. For example, the training module 110 may execute the neural network model 108 a number of times with workload points from the reference workloads 118A, 118B, 118N as input. If the neural network model 108 classifies the workload points to the correct reference workload 118A, 118B, 118N, no error is detected. On the other hand, if the neural network model 108 classifies the workload points to the wrong reference workload 118A, 118B, 118N, then an error is detected. If the error rate over the provided workload points exceeds a threshold level, then the training module 110 retrains the neural network model at operation 308 and stores the retrained neural network model 108 at operation 310.

At operation 312, the training module 110 determines whether the neural network model 108 produces an even distribution of class probability. The operation 312 may be executed in arrangements where the neural network model 108 includes a softmax layer as the last layer. The softmax layer implements a softmax activation function. As a result, each node of the softmax layer provides a probability that the input workload point is part of the class corresponding to the node.

In some examples, the neural network model 108 produces probabilities that are evenly distributed. Consider an example three-class neural network model 108 that produces softmax probabilities of {0.323, 0.300, 0.314}. In this example, the class having a probability of 0.323 is the highest probability. The reference workload corresponding to that class would be returned as the target workload. As can be seen, however, a neural network model with such an even class probability is more susceptible to noise and other similar errors.

In some examples, the training module 110 measures the probability distribution of the neural network model using an entropy function. For example, the entropy of a discrete random variable can be given by Equation [5] below:

$$H_n(\chi) = -\Sigma_{i=1}^n p(x_i) \log(p(x_i)) \qquad [5]$$

In equation [5], $p(x_i)$ is the probability of the $i^{th}$ outcome of the discrete random variable $\chi$. In this implementation, the discrete random variable $\chi$ is the output of the neural network model 108.

The entropy of the output $\chi$ indicates the probability distribution of the neural network model 108. For example, FIG. 4 is a diagram 400 showing a similarity index versus entropy for an example neural network model 108. In the example of FIG. 4, the neural network model 108 is a five layered fully-connected neural network with rectified linear unit (ReLU) activation and a last layer that is a softmax layer, as described herein. In FIG. 4, the similarity index indicates the number of classes (in a percentage scale) that have a nearly similar probability. As shown, the entropy value generally increases with the increasing similarity index. FIG. 4 shows four plots 402, 404, 406, where each plot 402, 404, 406 is generated based on a different number of workload points. The workload points can be source workload points 120 and/or may be selected from the reference workloads 118A, 118B, 118N. The plot 402 is generated based on 100 workload points. The plot 404 is generated based on 20 workload points. The plot 402 is generated based on 10 workload points.

FIG. 5 is a diagram 500 showing a similarity index versus normalized entropy for an example neural network model 108. In the example of FIG. 4, the neural network model 108 is a five layered fully-connected neural network with ReLU activation and a last layer that is a softmax layer, as described herein. The maximum value of entropy for the output x with a total of n possible outcomes is log(n). This may occur when the neural network model 108 generates equal probabilities that a given workload point is in each of the considered classes. As the number of classes differs, the value of entropy also differs. A normalized measure of entropy is given by Equation [6] below:

$$\eta(\chi) = -\sum_{i=1}^{n} \frac{p(x_i)\log(p(x_i))}{\log(n)} \quad [6]$$

In Equation [6], the value of $\eta(\chi)$ can range from 0 to 1. The diagram 500 shows three plots, each based on a different number of input workload points. The plot 502 is generated from 10 workload points. The plot 504 is generated from 20 workload datapoints. The plot 506 is generated from 100 workload datapoints.

To evaluate the operation 312, the training module 110, in some examples, determines an entropy of the neural network model 108 for a given source workload point 120 utilizing the Equation [5] and/or the Equation [6] and compares the resulting entropy to a threshold entropy. The threshold entropy can be determined, for example, by fixing the number of classes and the similarity index. If the entropy value is greater than the threshold, the training module 110 may determine that the probability distribution of the neural network model 108 is even and may retrain the model at operation 308 and store the retrained model at operation 310. If the entropy value is not greater than the threshold, the training module 110 may complete the process flow 300 at operation 314.

When retraining of the neural network model 108 is triggered because the previously-trained model has an even probability distribution at operation 312, the training module 110 may re-train the neural network model 108 with a condition that at least one of the reference workloads $W_2$ has one new point other than the source workload. The incoming source workload point 120 for which the entropy value was violated may be statically mapped to the target workload 113 that has maximum mapping frequency for the source workload. In some examples, the training module 110 implements additional rules at operation 312 to prevent frequency triggering of the retraining at operation 308. For example, in some implementations, a single data point may trigger more than one retraining of the neural network model 108.

The process flow 300 illustrates four conditions that may trigger the retraining of the neural network model 108 at operations 302, 304, 306, and 312. It will be appreciated that, in some examples, some or all of these retraining conditions may be omitted. Further, in some examples, additional conditions triggering retraining of the neural network model 108 may be added. Also, in some examples, a set of retraining conditions can be implemented using a technique different than the process flow 300. For example, instead of sequentially evaluating the conditions, as shown in FIG. 3, the training module may periodically monitor the value of the conditions and trigger an appropriate retraining if any one (or more) of the retraining conditions indicates that the neural network model 108 should be retrained.

Figure 6:
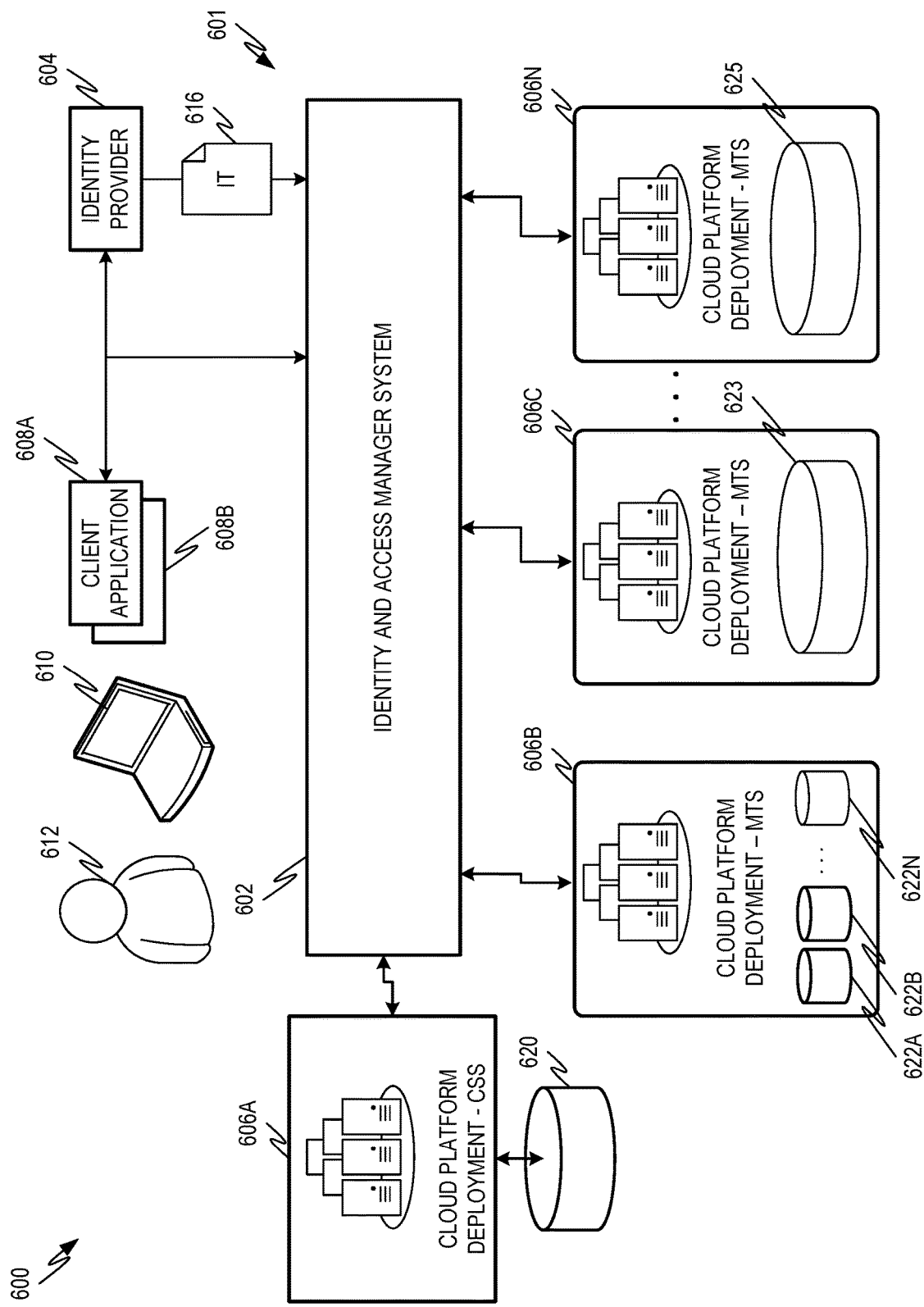
FIG. 6 is a diagram showing one example of an environment including a cloud platform that can be used to execute a database tuning service.

In some examples, a database tuning service as described herein is implemented in a cloud platform system. A cloud platform provides computing services to multiple customers over multiple geographic areas. FIG. 6 is a diagram showing one example of an environment 600 including a cloud platform 601 that can be used to execute a database tuning service. The environment 100 includes the cloud platform 601, an identity provider system 604 and a user computing device 610 that executes one or more client applications 608A, 608B for the user 612.

The cloud platform 601 includes multiple cloud platform deployments 606A, 606B, 606C, 606N. Although four cloud platform deployments 606A, 606B, and 606N are shown, the cloud platform 601 may include more or fewer cloud platform deployments, for example, depending on the implementation. Each cloud platform deployment 606A, 606B, 606C, 606N implements a solution for one or more customers of the cloud platform 601. In the example of FIG. 6, the cloud platform deployment 606A implements a customer system solution and cloud platform deployments 606B, 606C, 606N implement multi-tenant solutions and/or services. In practice, a cloud platform 601 can include any suitable mix of cloud platform deployments for multi-tenant solutions, multi-tenant services, and customer system solutions. In some examples, a database tuning service, such as the database tuning service 102 of FIG. 1, is implemented at one of the cloud platform deployments 606A, 606B, 606C, 606N. Also, various database service instances to be tuned by the tuning service may be implemented at one or more of the cloud platform deployments 606A, 606B, 606N.

The example cloud platform deployment 606A implements a customer system solution. The cloud platform deployment 606A may be executed on a server or system of servers that are dedicated to a given customer. A database 620 persists data for the cloud platform deployment 606A. For example, the user 612 may access the cloud platform deployment 606A and its database 620 only if the user 612 is associated with cloud platform customer for which the cloud platform deployment 606A is implemented.

Cloud platform deployments 606B, 606C, 606N, which implement multi-tenant solutions and/or services, are not customer-specific and segregate persisted data for multiple different tenants. Accordingly, the multi-tenant cloud platform deployments maintain separate data persistence for different tenants. In the example of FIG. 6, the cloud platform deployment 606B implements multiple databases 622A, 622B, 622N, wherein each database 622A, 622B, 622N corresponds to a single tenant. The cloud platform deployment 606C implements a database 623 that includes various tables, wherein each table includes a column that indicates a tenant identifier. Accordingly, records in the tables include a record field that includes the tenant identifier corresponding to that record. The cloud platform deployment 606N includes a database 625 that comprises different schemas. Each schema is associated with a particular tenant. Further, each schema is associated with a tenant identifier indicating the zone to which the corresponding tenant belongs.

The cloud platform deployments 606A, 606B, 606C, 606N may be implemented in different geographic regions. For example, a first cloud platform deployment 606A may be implemented by one or more servers at one or more data centers in North America; a second cloud platform deployment 606B may be implemented by one or more servers at one or more data centers in east Asia, a third cloud platform deployment 606N may be implemented by one or more servers at one or more data centers in Europe, and so on. In some examples, more than one cloud platform deployment 606A, 606B, 606C, 606N is implemented in the same geographic region.

The user 612 is associated with a customer of the cloud platform 601. For example, the user 612 may be an employee of a customer, and/or a customer of the cloud platform customer. The user computing device 610 may be any suitable computing device including, for example, a mobile telephone, a tablet computing device, a laptop computing device, a desktop computing device, etc. In some examples, the user 612 is a human user. In FIG. 6, the example client applications 608A, 608B is operated by a human user 612. In some examples, the user is non-human (e.g., a software or hardware component). For example, the client applications 608A, 608B may have a user account with an identity provider system 604 and/or identity and access management system 602 that does not require human intervention to use. Accordingly, client applications 608A, 608B, in some examples, does not include the user 612 and/or operate independent of the user 612.

To access the cloud platform 601, the user 612 (e.g., via a client application 608A, 608B) authenticates to the identity provider system 604. The user 612 may authenticate with the identity provider system 604 either before receiving access to the cloud platform 601. In some examples, the user 612 first requests a logon from the identity and access management system 602. In these examples, the identity and access management system 602 directs the user 612 to the identity provider system 604 for authentication. In other examples, the user 612 initially authenticates with the identity provider system 604 and then requests logon at the identity and access management system 602.

The identity provider system 604 authenticates the user 612 using any suitable method. In some examples, the identity provider system 604 authenticates the user using single factor authentication, such as, for example, a user name and password. In other examples, the identity provider system 604 authenticates the user 612 using two-factor authentication or any other suitable technique. When the user 612 is authenticated by the identity provider system 604, the identity provider system 604 provides an identity token 616 to the identity and access management system 602. The identity token 616 indicates the identity of the user 612.

The identity token 616 can be in any suitable format. In some examples, the identity provider system 604 generates the identity token 616 token according to the Security Assertion Markup Language (SAML). In some examples, the identity token 616 is cryptographically signed by the identity provider system 604. The identity token 616, in some examples, is cryptographically signed using a private cryptographic key of the identity provider system 604. Accordingly, the identity and access management system 602 may verify the identity token 616 using a public key known to be associated with the identity provider system 604.

In some examples, the identity token 616 also indicates a customer-defined user group to which the user belongs. For example, the identity provider system 604 may include user/group data that ties users 612 to particular groups. The user/group data may be provided by and/or based on data provided by a customer associated with the user 612. The group to which a user is assigned may be used by the cloud platform 601 to manage permissions at the various cloud platform deployments 606A, 606B, 606C, 606N. For example, groups may be associated with roles, role collections, and scopes, for example, at the identity and access management system. A role describes a function or responsibility of a user that is associated with one or more scopes. For example, a role platform developer may include a scope that permits the developer to have read access to a zone called Project X According, the role platform developer may include a scope zone. read for the zone Project X. The role platform developer, in some examples, includes other scopes for other zones and/or the same zone. For example, the role platform developer may also include a scope zone.write for the zone Project X A role collection is a collection of roles that includes multiple roles. For example, a role collection developer may include the role platform developer as well as other roles (e.g., user interface developer, database developer, development project manager, etc.).

The identity token 616 is provided to the identity and access management system 602. The identity and access management system 602 may provide the identity token 616 and/or a modified identity token to one or more of the cloud platform deployments 606A, 606B, 606N that implements a service or solution that the user 612 is entitled to access.

Figure 7:
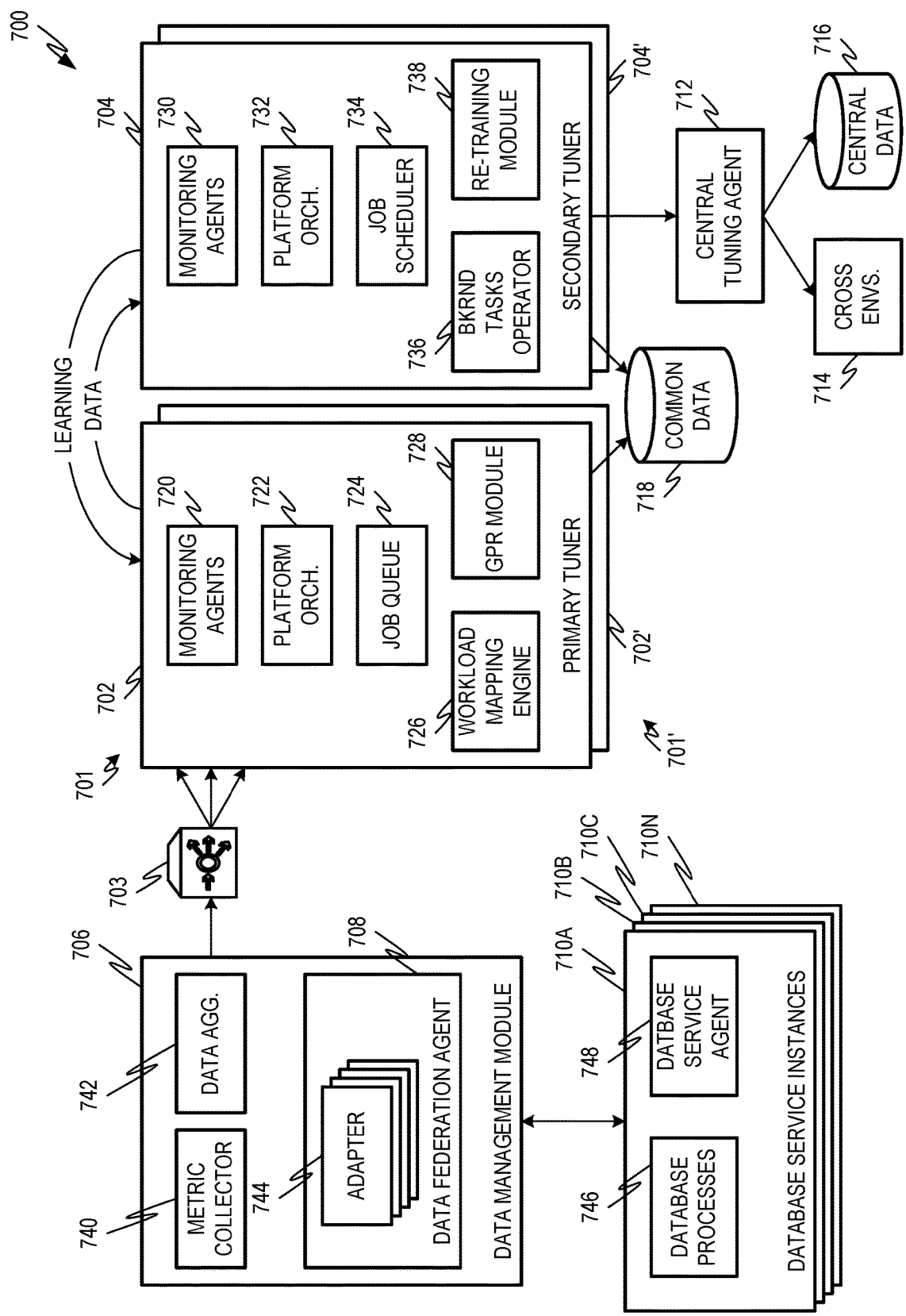
FIG. 7 is a diagram showing one example of an environment showing one example way to implement a database tuning service in a cloud platform, such as the cloud platform of FIG. 6.

FIG. 7 is a diagram showing one example of an environment 700 showing one example way to implement a database tuning service in a cloud platform, such as the cloud platform 601 of FIG. 6. In the example of FIG. 7, a database tuning service 701 includes a primary tuner 702 and a secondary tuner 704. The primary tuner 702 may generally perform live or real-time operations such as, for example, generating recommended knob configurations for database service instances 710A, 710B, 710C, 710N. The secondary tuner 704 may perform background tasks such as, for example, retraining the neural network model used for classification and monitoring the operation of the database tuning service 701. The database tuning service 701 may execute as a cloud platform deployment similar to those described with respect to FIG. 6. In some examples, the primary tuner 702 and secondary tuner 704 are executed at the same cloud platform deployment or may be executed at different deployments. In some examples, the primary tuner 702 and secondary tuner 704 are executed at separate virtual machines implemented in the cloud environment.

Database service instances 710A, 710B, 710C, 710N may also execute at respective cloud platform deployments. The database service instances 710A, 710B, 710C, 710N are services and/or other software solutions implemented on a cloud platform that include or utilize a database process 746. A database process 746 is a process that manages a database. Example database processes 746 include Postgressql, MySQL, MongoDB, etc. Database service instances 710A, 710B, 710C, 710N may also include a database service agent 748. A database service agent 748 manages a database, for example, to ensure that the database process 746 does not crash, to monitor the health of the database process.

In some examples, the database service agent 748 subscribes to the database tuning service 701. For example, the database service agent 748 may periodically provide the database tuning service 701 with workload points describing the workload of its corresponding database process 746 including, for example, the current knob configuration of the database process. This data provided by the database service agent 748 may make up some or all of the reference workloads described herein. The database service agent 748 may also periodically request from the database tuning service 701 a recommended knob configuration for its corresponding database process 746. Upon receiving a recommended knob configuration, the database service agent 748 may apply the recommended knob configuration to its database process 746. In some examples, the database service agent 748 performs a pre-validation of a recommended knob configuration before applying the recommended knob configuration.

A data management module 706 may also be implemented as a cloud platform deployment and may handle data transfer between the database service instances 710A, 710B, 710C, 710N and the database tuning service 701. A data federation agent 708 comprises one or more adapters 744 that facilitate communication between other modules, such as the metric collector 740 and data aggregator 742, and various database types, for example, without regard for the specific nuances of the different database types. In this way, the database tuning service 701, a generic component, may communicate with various different types of databases.

The metric collector 740 collects performance metric and knob configurations from the various database service instances 710A, 710B, 710C, 710N. The data aggregator 742 formats and aggregates the collected performance metric and knob configuration data into a format expected by the database tuning service 701. The performance metric and knob configuration data is provided to the tuning service 701 for use as reference workloads, as described herein. The data is provided to the database tuning service 701 via a load balancer 703.

As described herein, the database tuning service 701 comprises a primary tuner 702 and a secondary tuner 704. As described herein, the primary tuner 702 may be configured to perform on-demand tasks such as, for example, the classification operation and the recommendation operation. The secondary tuner 704 is configured to perform background tasks, such as monitoring and retraining the neural network model. In some examples, a scaler component of the cloud platform instantiates and/or deactivates different instances of the primary tuner 702 and secondary tuner 704, for example based on workload.

The primary tuner 702 receives database tuning requests from database service instances 710A, 710B, 710C, 710N. In some examples, requests for database tuning includes a source workload point. For each request, a task is created and may be buffered in a job queue 724. Tasks may be executed serially.

When a task is executed, a workload mapping engine 726 classifies the source workload point associated with the task to identify a target workload. For example, the workload mapping engine 726 may operate in a manner similar to the classification module 104 of FIG. 1. The workload mapping engine 726 may access the neural network model and reference workload data from a common model storage location 718 that is accessible to both the primary tuner 702 and the secondary tuner 704. A GPR module 728 utilizes the target workload to generate a recommended knob configuration that is responsive to the request associated with the task. For example, the GPR module 728 may train a GPR and then utilize the trained GPR to generate the recommended knob configuration, for example, similar to the recommendation module 112 of FIG. 1. Monitoring agents 720 and platform orchestrator agents 722 may also be executed to facilitate lifecycle operations and health monitoring at the primary tuner 702.

The secondary tuner 704 comprises a job scheduler 734 that periodically schedules background tasks. For example, a background tasks operator 736 may be periodically scheduled by the job scheduler 734 to monitor various conditions of the database tuner that may trigger a retraining such as, for example, whether a new source database (e.g., database service instance 710A, 710B, 710C, 710N has been installed (operation 302), whether there has been a change to the highest ranked performance metrics and/or knobs (operation 304), whether the error rate of a neural network model exceeds an error rate threshold (operation 306), whether a neural network has an even distribution of class probabilities (operation 312). In some examples, the secondary tuner determines if there has been a change to the highest ranked performance knobs by considering a current set of ranked knobs and comparing the current set of ranked knobs to a previous set of ranked knobs (e.g., the most recent set of ranked knobs). If there is a difference, indicating a change to the highest ranked knobs, then the secondary tuner determines to retrain the neural network model. The re-training module 738 retrains the neural network model if appropriate. The re-trained neural network model is stored at the common model storage location 718 where it can be accessed by the primary tuner 702. Also, monitoring agents 730 and platform orchestrator agents 732 may also be executed to facilitate lifecycle operations and health monitoring at the secondary tuner 704.

The database tuning service 701 also includes a central tuning agent 712. The central tuning agent may leverage learning gained by the database tuning service 701 in in one landscape (e.g., for one database service instance) and apply it other landscapes. The central tuning agent 712 may be connected to multiple different deployments of the database tuning service in different environments, making it a cross-environment 714 component. The central tuning agent 712 collects learning models and data points of the tuning services, including database tuning service 701 across different environments. The resulting data is stored at a central data repository 716. Learning data collected by the central tuning agent 712 be provided to the secondary tuner 704, for example, for retraining the secondary tuner 704. For example, learning data collected by the central tuning agent 712 may make up some or all of the reference workloads used to train a neural network model as described herein.

In some examples, the environment 700 can include multiple tuning service deployments. For example, the environment 700 can include a database tuning service 701' including a primary tuner 702' and a secondary tuner 704'. The database tuning service 701' may be implemented, for example, at a different cloud platform deployment than the database tuning service 701. In various examples, database tuning services 701, 701' across different cloud platform deployments can share data for training respective neural network models. For example, the retraining module 738 of the secondary tuner 704 may access workload data and/or performance metric data gathered from the database tuning service 701' implemented at a different cloud platform deployment. For example, the database tuning service 701' may gather workload data and/or performance metric data from database service instances 710A, 710B, 710C that are serviced by the database tuning service 701'. In some examples, different deployments may utilize the same common model storage location 718 or another common storage location for sharing performance metric data and/or workload data.

Figure 8:
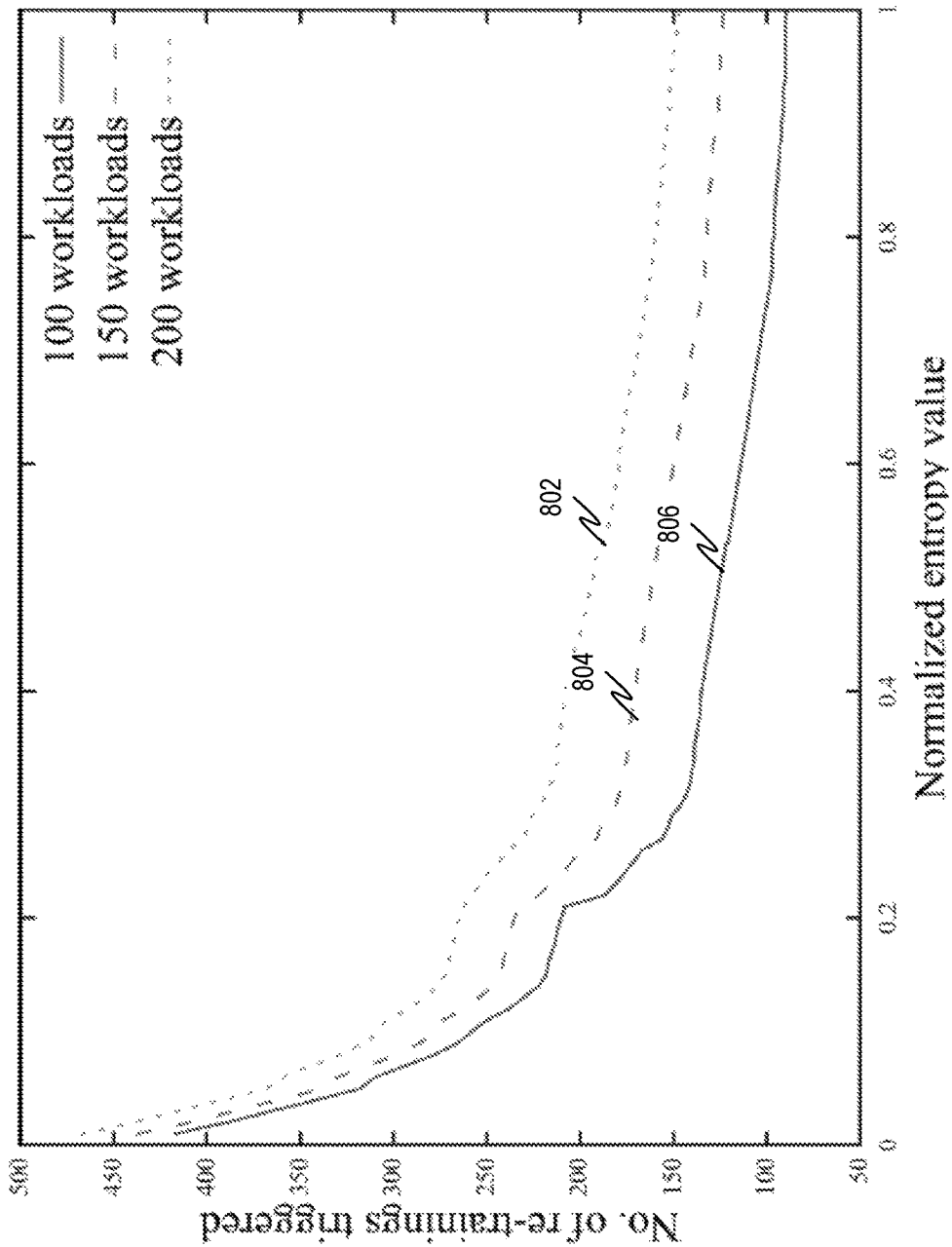
FIG. 8 is a diagram showing a frequency at which the neural network model was retrained in the example neural network classification tuner described herein.
Figure 9:
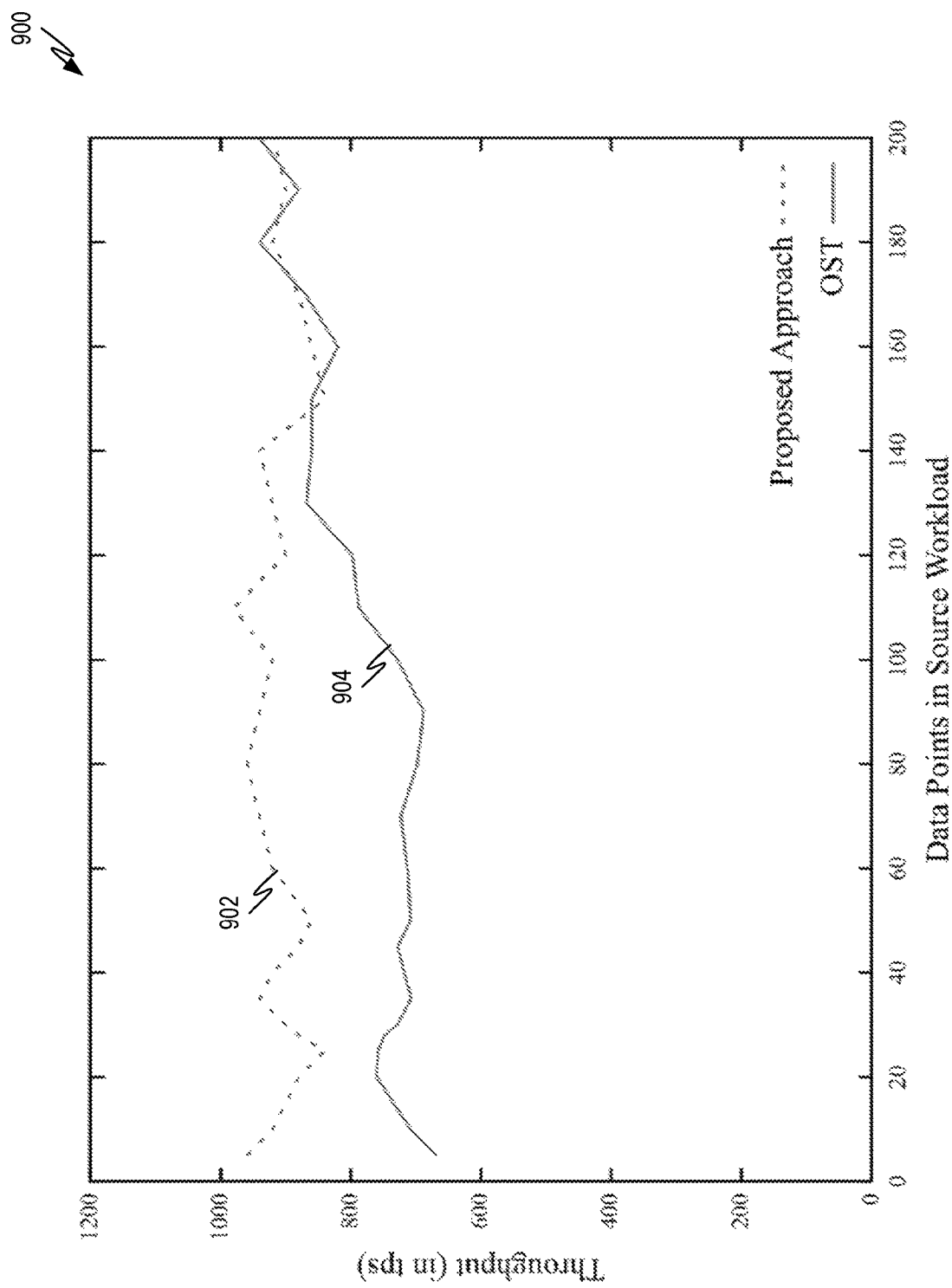
FIG. 9 is diagram showing a comparison of the throughput of an Ottertune style tuner and the neural network classification tuner described herein.
Figure 10:
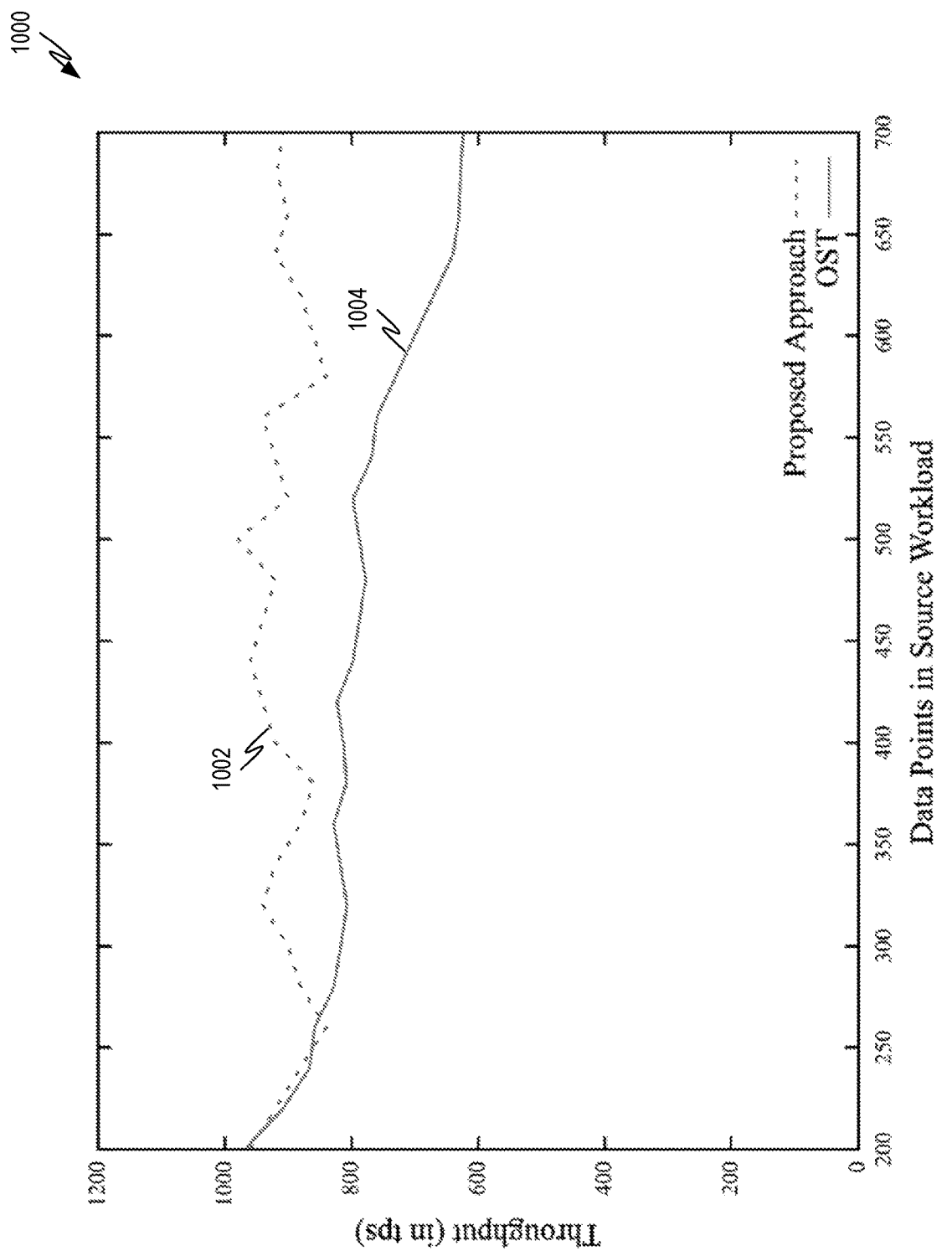
FIG. 10 is a diagram showing a comparison of the throughput of an Ottertune style tuner and the neural network classification tuner described herein.

The inventors generated a comparison of an example of a database tuner using a neural network model for classification compared to an OST tuner. TABLE 1 and FIGS. 8, 9, and 10 show results of the comparison. For purposes of the comparison, the tuning service implemented using a neural network model for classification, as described herein, is referred to as a neural network classification tuner while OST tuners are referred to as such.

The comparison utilized Amazon Web Services (AWS) with infrastructure resources provisioned by Cloud Foundry and managed by the Bosh tool chain. The tested tuner included twelve tuning service instances, with each tuner instance executing in a virtual machine utilizing four virtual central processing units (4vCPU) and sixteen (16) GB of memory. The setup include five config-director instances. A total of eighty (80) love database deployments were used for tuning. The databases were PostgreSQL v9.6. All of the tuning service instances collected data from a common repository. Reference workloads were generated using a ten minute observation time for the YCSB and Wikipedia benchmarks and a five minute observation time for the TPCC benchmark.

TABLE 1 shows results of the comparison:

|  | OST | | Neural Net Classification | |
| --- | --- | --- | --- | --- |
| Production Data | f1 score | Accuracy | f1 score | Accuracy |
| W = 100 m = 30 | 0.4325 | 0.4412 | 0.865 | 0.877 |
| W = 100 m = 500 | 0.8712 | 0.8667 | 0.9385 | 0.9333 |
| W = 200 m = 30 | 0.3235 | 0.3210 | 0.865 | 0.8525 |
| W = 200 m = 500 | 0.9145 | 0.9220 | 0.895 | 0.9035 |
| W = 300 m = 30 | 0.24 | 0.2420 | 0.8225 | 0.8225 |
| W = 300 m = 500 | 0.8215 | 0.8410 | 0.8565 | 0.887 |

In TABLE 1, W and m represent the number of workloads and data points per workload in the production environment respectively. F1 Score and Accuracy are the evaluation parameters for the efficiency of the neural network model. Higher f1 scores and higher accuracy scores correspond to better models. When neural network models are trained with training data having the same distribution of classes, accuracy provides a suitable comparison of model performance. In the example shown by TABLE 1, however, the class distribution of the models was not the same, hence the f1 score is a better indicator of model performance in this example. TABLE 1 shows that, in this example, when the sample set is smaller (i.e. when each workload includes fewer data points) the f1 score is significantly better using the neural network model as than it is with the OST approach. When the sample set is bigger (e.g., when m=500), the quality of the OST approaches increased.

FIG. 8 is a diagram 800 showing a frequency at which the neural network model was retrained in the example neural network classification tuner described herein. The diagram 800 includes three plots 802, 804, 806. Plot 802 shows results using two hundred reference workloads. Plot 804 shows results using one hundred and fifty reference workloads. Plot 806 shows results using one hundred reference workloads. As shown, more retrainings occur at relatively lower levels of entropy. Further, using more reference workloads tends to increase the frequency of retraining.

FIG. 9 is diagram 900 showing a comparison of the throughput of an OST tuner and the neural network classification tuner described herein. In the diagram 900, the horizontal axis indicates the number of points in a source workload. The vertical axis indicates the throughput of the tuners. A plot 902 describes the neural network classification tuner and a plot 904 describes the example OST tuner. The diagram 900 illustrates the cold-start problem described above. As the size of the source workload increases, the OST tuner receives more workload points from the source workload and is able to produce more accurate recommended knob configurations. When the OST tuner lacks a large number of source workload points, however, the accuracy, and thus the throughput, suffers. This is shown in the diagram 900 where the plot 904 corresponding to the OST tuner begins at a lower throughput and then increases. The plot 902 corresponding to the neural network classification tuner is consistently at a higher throughput even when the number of points in the source workload is low.

FIG. 10 is a diagram 1000 showing a comparison of the throughput of an OST tuner and the neural network classification tuner described herein. In the diagram 1000, the horizontal axis indicates the number of points in a source workload and the vertical axis indicates the throughput of the tuners. In this example, the reference workloads included one hundred and ten (110) write-oriented workloads and 8 read-oriented workloads. The source workload is a read-oriented workload. A plot 1002 describes the neural network classification tuner while a plot 1004 describes the OST tuner. As shown, the throughput of the neural network classification tuner remained relatively constant over the range of source workload points. On the other hand, the OST tuner performance dropped off as the number of source workload points increased. For example, this is due to a cascading effect of sub-optimal recommended knob sets.

EXAMPLES

Example 1 is a system for tuning a database service in a cloud platform, the system comprising: at least one processor programmed to perform operations comprising: accessing a neural network model trained to classify workload points to one of classes; executing the neural network model with a first source workload point as input to return a first class as output, the first source workload describing a source database; selecting a target workload for the first source workload point from a plurality of reference workloads, the selecting based at least in part on the first class returned by the neural network model; and generating recommended knob configuration for the source database using the target workload.

In Example 2, the subject matter of Example 1 optionally includes wherein the first source workload point comprises knob configuration data describing a knob configuration of the source database under a first source workload and at least one performance metric describing the source database under the first source workload.

In Example 3, the subject matter of any one or more of Examples 1-2 optionally include wherein the neural network model comprises a plurality of layers, and wherein a last layer of the neural network model is a softmax layer.

In Example 4, the subject matter of Example 3 optionally includes wherein the neural network model is arranged with rectified linear unit (ReLU) activation.

In Example 5, the subject matter of any one or more of Examples 1-4 optionally include wherein generating the recommended knob configuration for the source database comprises generating the recommended knob configuration to optimize database accuracy.

In Example 6, the subject matter of any one or more of Examples 1-5 optionally include the operations further comprising receiving, by a primary tuner, a request to generate the recommended knob configuration, wherein the accessing of the neural network model is by the primary tuner and from a common model storage location that is shared by the primary tuner and a secondary tuner.

In Example 7, the subject matter of Example 6 optionally includes the operations further comprising: training the neural network model by the secondary tuner; and storing the neural network model, by the secondary tuner, at the common model storage location.

In Example 8, the subject matter of Example 7 optionally includes the operations further comprising: determining, by the secondary tuner, a current set of ranked knobs; comparing, by the secondary tuner, the current set of ranked knobs to a previous set of ranked knobs; and determining to retrain the neural network model based at least in part on the comparing.

In Example 9, the subject matter of any one or more of Examples 7-8 optionally include wherein the primary tuner and the secondary tuner are part of a first tuning service deployment, the operations further comprising accessing workload data or performance metric data from a second tuning service deployment, wherein the training of the neural network model by the secondary tuner is based at least in part on the workload data or performance metric data gathered from the second tuning service deployment.

In Example 10, the subject matter of any one or more of Examples 1-9 optionally include the operations further comprising: determining probability distributions for the plurality of reference workloads using the neural network model; and determining to retrain the neural network model based at least in part on the probability distributions.

Example 11 is a method of tuning a database service in a cloud platform, the method comprising: accessing a neural network model trained to classify workload points to one of classes; executing the neural network model with a first source workload point as input to return a first class as output, the first source workload describing a source database; selecting a target workload for the first source workload point from a plurality of reference workloads, the selecting based at least in part on the first class returned by the neural network model; and generating recommended knob configuration for the source database using the target workload.

In Example 12, the subject matter of Example 11 optionally includes wherein the first source workload point comprises knob configuration data describing a knob configuration of the source database under a first source workload and at least one performance metric describing the source database under the first source workload.

In Example 13, the subject matter of any one or more of Examples 11-12 optionally include wherein the neural network model comprises a plurality of layers, and wherein a last layer of the neural network model is a softmax layer.

In Example 14, the subject matter of Example 13 optionally includes wherein the neural network model is arranged with rectified linear unit (ReLU) activation.

In Example 15, the subject matter of any one or more of Examples 11-14 optionally include wherein generating the recommended knob configuration for the source database comprises generating the recommended knob configuration to optimize database accuracy.

In Example 16, the subject matter of any one or more of Examples 11-15 optionally include receiving, by a primary tuner, a request to generate the recommended knob configuration, wherein the accessing of the neural network model is by the primary tuner and from a common model storage location that is shared by the primary tuner and a secondary tuner.

In Example 17, the subject matter of Example 16 optionally includes training the neural network model by the secondary tuner; and storing the neural network model, by the secondary tuner, at the common model storage location.

In Example 18, the subject matter of Example 17 optionally includes determining, by the secondary tuner, a current set of ranked knobs; comparing, by the secondary tuner, the current set of ranked knobs to a previous set of ranked knobs; and determining to retrain the neural network model based at least in part on the comparing.

In Example 19, the subject matter of any one or more of Examples 17-18 optionally include wherein the primary tuner and the secondary tuner are part of a first tuning service deployment, the method further comprising accessing workload data or performance metric data from a second tuning service deployment, wherein the training of the neural network model by the secondary tuner is based at least in part on the workload data or performance metric data gathered from the second tuning service deployment.

Example 20 is a non-transitory machine readable medium comprising instructions thereon that, when executed by at least one processor, causes the at least one processor to perform operations comprising: accessing a neural network model trained to classify workload points to one of classes; executing the neural network model with a first source workload point as input to return a first class as output, the first source workload describing a source database; selecting a target workload for the first source workload point from a plurality of reference workloads, the selecting based at least in part on the first class returned by the neural network model; and generating recommended knob configuration for the source database using the target workload.

Figure 11:
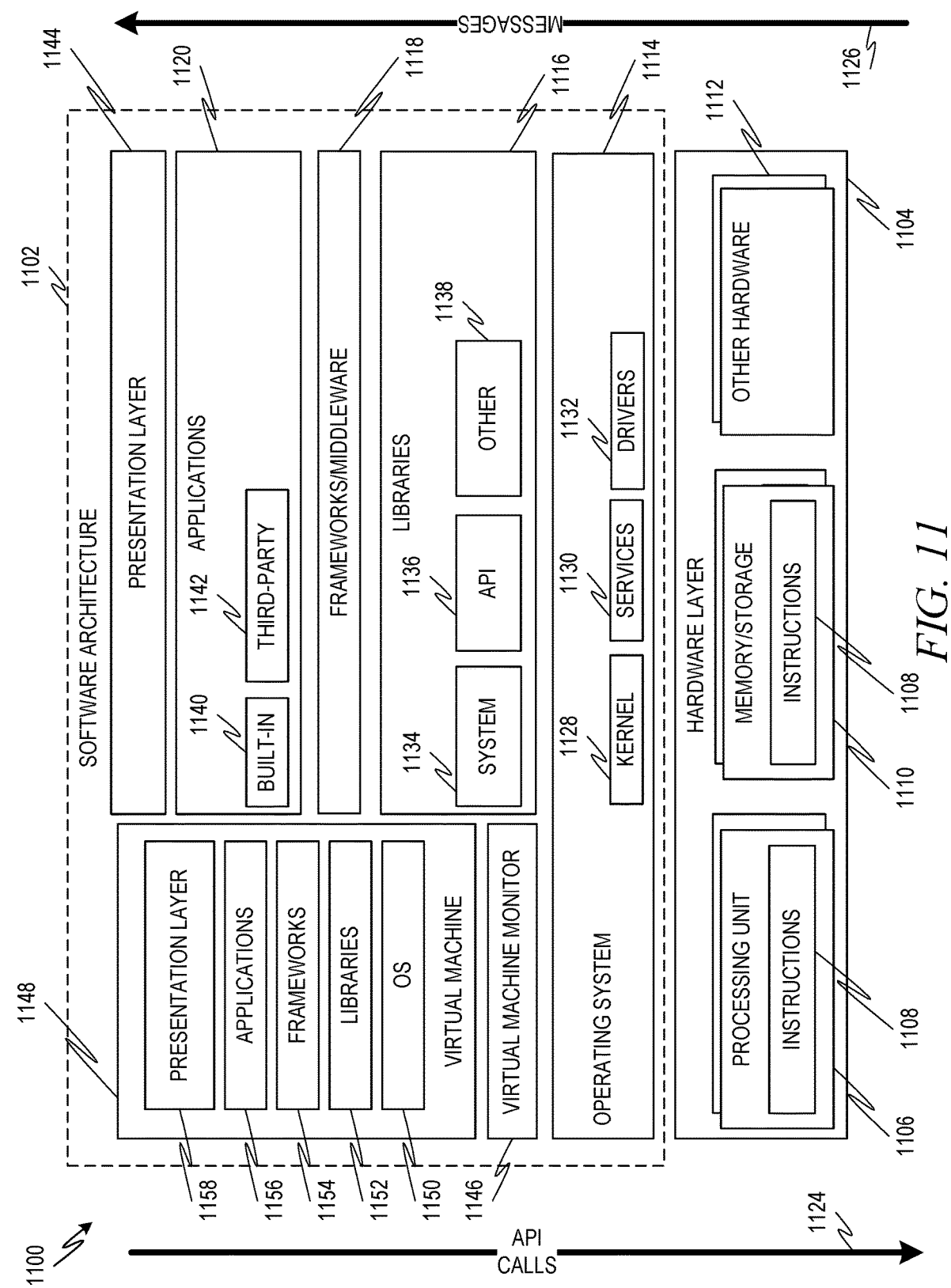
FIG. 11 is a block diagram showing one example of a software architecture for a computing device.

FIG. 11 is a block diagram 1100 showing one example of a software architecture 1102 for a computing device. The architecture 1102 may be used in conjunction with various hardware architectures, for example, as described herein. FIG. 11 is merely a non-limiting example of a software architecture and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system of FIG. 11.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of the software architecture 1102.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware layer 1118, applications 1120 and presentation layer 1144. Operationally, the applications 1120 and/or other components within the layers may invoke application programming interface (API) calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks layer 1118 (also sometimes referred to as the middleware layer) may provide a higher-level common infrastructure that may be utilized by the applications 1120 and/or other software components/modules. For example, the frameworks layer 1118 may provide various graphic user interface (GUI) functions, high-level resource management, high-level location services, and so forth. The frameworks/middleware layer 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android® Phone, or other mobile computing device operating systems. In this example, the third-party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system library 1134, API libraries 1136, and other libraries 1138), frameworks/middleware layer 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 and/or presentation layer 1158. These layers of software architecture executing within the virtual machine 1148 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).
Electronic Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

Figure 12:
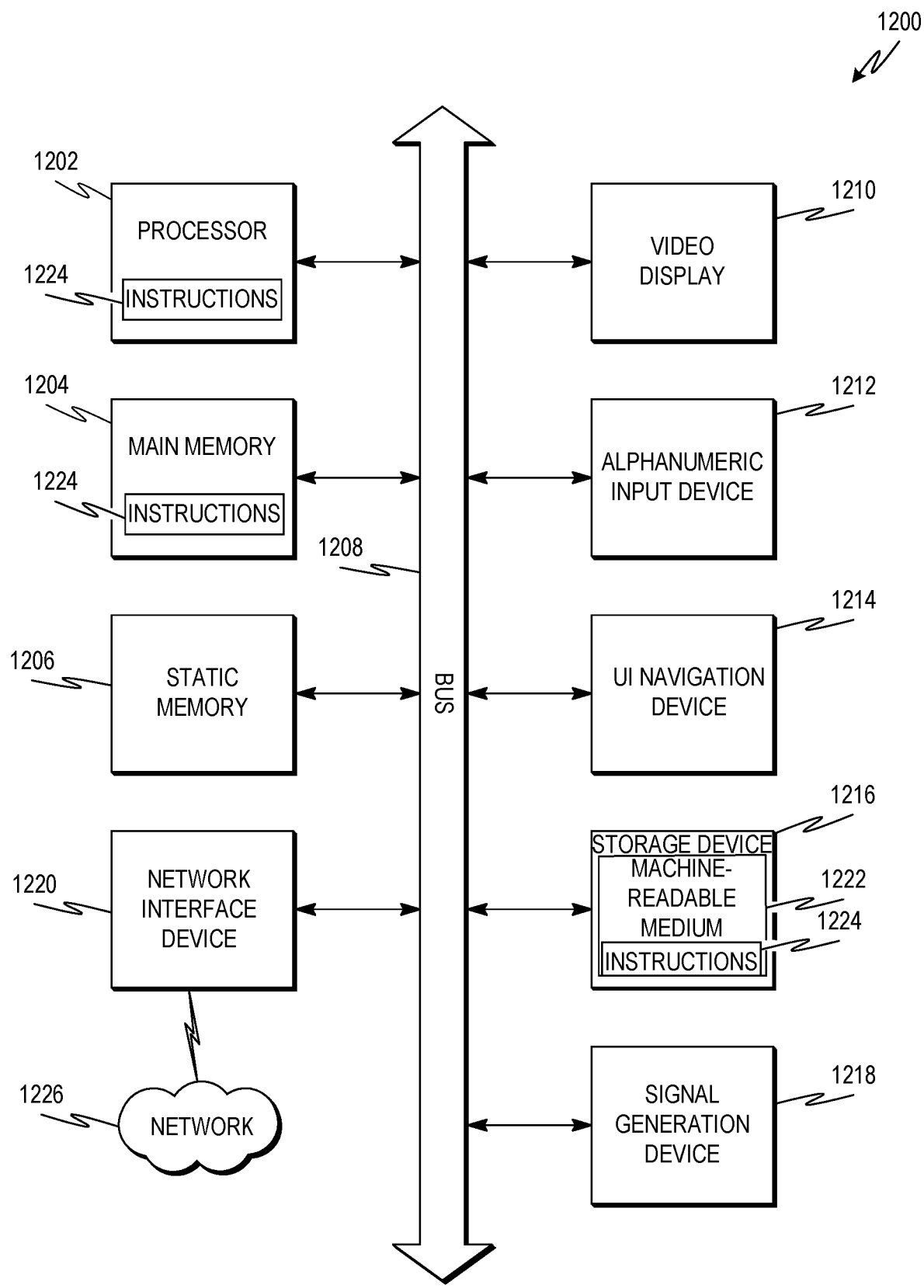
FIG. 12 is a block diagram of a machine in the example form of a computing system within which instructions may be executed for causing the machine to perform any one or more of the methodologies discussed herein.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.
Example Machine Architecture and Machnine-Readable Medium FIG. 12 is a block diagram of a machine in the example form of a computer system 1200 within which instructions 1224 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation (or cursor control) device 1214 (e.g., a mouse), a disk drive unit 1216, a signal generation device 1218 (e.g., a speaker), and a network interface device 1220.

Machine-Readable Medium

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable medium 1222.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for tuning a database service in a cloud platform, the system comprising:
   at least one processor programmed to perform operations comprising:
      accessing a neural network model trained to classify workload points to one of a plurality of classes;
      executing the neural network model with a first source workload point as input to return a first class of the plurality of classes as output, the first source workload point describing a source database;
      selecting a target workload for the first source workload point from a plurality of reference workloads, the selecting based at least in part on the first class returned by the neural network model; and
      generating recommended knob configuration for the source database using the target workload.

2. The system of claim 1, wherein the first source workload point comprises knob configuration data describing a knob configuration of the source database under a first source workload and at least one performance metric describing the source database under the first source workload.

3. The system of claim 1, wherein the neural network model comprises a plurality of layers, and wherein a last layer of the neural network model is a softmax layer.

4. The system of claim 3, wherein the neural network model is arranged with rectified linear unit (ReLU) activation.

5. The system of claim 1, wherein generating the recommended knob configuration for the source database comprises generating the recommended knob configuration to optimize database accuracy.

6. The system of claim 1, the operations further comprising receiving, by a primary tuner, a request to generate the recommended knob configuration, wherein the accessing of the neural network model is by the primary tuner and from a common model storage location that is shared by the primary tuner and a secondary tuner.

7. The system of claim 6, the operations further comprising:
training the neural network model by the secondary tuner; and
storing the neural network model, by the secondary tuner, at the common model storage location.

8. The system of claim 7, the operations further comprising:
determining, by the secondary tuner, a current set of ranked knobs;
comparing, by the secondary tuner, the current set of ranked knobs to a previous set of ranked knobs; and
determining to retrain the neural network model based at least in part on the comparing.

9. The system of claim 7, wherein the primary tuner and the secondary tuner are part of a first tuning service deployment, the operations further comprising accessing workload data or performance metric data from a second tuning service deployment, wherein the training of the neural network model by the secondary tuner is based at least in part on the workload data or performance metric data gathered from the second tuning service deployment.

10. The system of claim 1, the operations further comprising:
determining probability distributions for the plurality of reference workloads using the neural network model; and
determining to retrain the neural network model based at least in part on the probability distributions.

11. A method of tuning a database service in a cloud platform, the method comprising:
accessing a neural network model trained to classify workload points to one of a plurality of classes;
executing the neural network model with a first source workload point as input to return a first class of the plurality of classes as output, the first source workload point describing a source database;
selecting a target workload for the first source workload point from a plurality of reference workloads, the selecting based at least in part on the first class returned by the neural network model; and
generating recommended knob configuration for the source database using the target workload.

12. The method of claim 11, wherein the first source workload point comprises knob configuration data describing a knob configuration of the source database under a first source workload and at least one performance metric describing the source database under the first source workload.

13. The method of claim 11, wherein the neural network model comprises a plurality of layers, and wherein a last layer of the neural network model is a softmax layer.

14. The method of claim 13, wherein the neural network model is arranged with rectified linear unit (ReLU) activation.

15. The method of claim 11, wherein generating the recommended knob configuration for the source database comprises generating the recommended knob configuration to optimize database accuracy.

16. The method of claim 11, further comprising receiving, by a primary tuner, a request to generate the recommended knob configuration, wherein the accessing of the neural network model is by the primary tuner and from a common model storage location that is shared by the primary tuner and a secondary tuner.

17. The method of claim 16, further comprising:
training the neural network model by the secondary tuner; and
storing the neural network model, by the secondary tuner, at the common model storage location.

18. The method of claim 17, further comprising:
determining, by the secondary tuner, a current set of ranked knobs;
comparing, by the secondary tuner, the current set of ranked knobs to a previous set of ranked knobs; and
determining to retrain the neural network model based at least in part on the comparing.

19. The method of claim 17, wherein the primary tuner and the secondary tuner are part of a first tuning service deployment, the method further comprising accessing workload data or performance metric data from a second tuning service deployment, wherein the training of the neural network model by the secondary tuner is based at least in part on the workload data or performance metric data gathered from the second tuning service deployment.

20. A non-transitory machine readable medium comprising instructions thereon that, when executed by at least one processor, causes the at least one processor to perform operations comprising:
accessing a neural network model trained to classify workload points to one of a plurality of classes;
executing the neural network model with a first source workload point as input to return a first class of the plurality of classes as output, the first source workload point describing a source database;
selecting a target workload for the first source workload point from a plurality of reference workloads, the selecting based at least in part on the first class returned by the neural network model; and
generating recommended knob configuration for the source database using the target workload.

* * * * *